United States Patent
Bailey

(10) Patent No.: US 8,627,568 B2
(45) Date of Patent: Jan. 14, 2014

(54) MANUFACTURE OF A FILTER SCREEN

(75) Inventor: Marshall G. Bailey, Dubai (AE)

(73) Assignee: Axiom Process Ltd., Newcastle upon Tyne (GB)

( * ) Notice: Subject to any disclaimer, the term of this patent is extended or adjusted under 35 U.S.C. 154(b) by 146 days.

(21) Appl. No.: 13/203,105

(22) PCT Filed: Feb. 24, 2010

(86) PCT No.: PCT/GB2010/000328
§ 371 (c)(1), (2), (4) Date: Sep. 20, 2011

(87) PCT Pub. No.: WO2010/097578
PCT Pub. Date: Sep. 2, 2010

(65) Prior Publication Data
US 2012/0000052 A1    Jan. 5, 2012

(30) Foreign Application Priority Data
Feb. 25, 2009   (GB) .................................. 0903197.2

(51) Int. Cl.
*B23P 15/16*  (2006.01)
(52) U.S. Cl.
USPC ..................................... 29/896.62; 29/896.6

(58) Field of Classification Search
USPC ............................................. 29/896.6, 896.62
See application file for complete search history.

(56) References Cited

U.S. PATENT DOCUMENTS

| | | |
|---|---|---|
| 3,915,775 A | 10/1975 | Davis |
| 5,032,210 A | 7/1991 | Hukki et al. |

FOREIGN PATENT DOCUMENTS

| | | |
|---|---|---|
| GB | 1578948 A | 11/1980 |
| GB | 2322590 A | 9/1998 |
| GB | 2337019 A | 11/1999 |
| GB | 2388558 A | 11/2003 |

*Primary Examiner* — Richard Chang
(74) *Attorney, Agent, or Firm* — Gifford, Krass, Sprinkle, Anderson & Citkowski, P.C.

(57) ABSTRACT

A method of manufacturing a filtering screen includes: attaching handle members (3) to edges of at least one wire cloth (1); providing a jig comprising tensioning means (23); placing the at least one wire cloth (1) in the jig and engaging the handle members (3) with handle member engagement portions (15) of the tensioning means (23). The tensioning means (23) are operated to drive the handle members (3) outwardly to tension the wire cloth (1) in orthogonal directions. The method also includes pressing the tensioned wire cloth (1) against a screen frame (6); bonding the wire cloth (1) to the screen frame (6); and trimming the wire cloth.

26 Claims, 6 Drawing Sheets

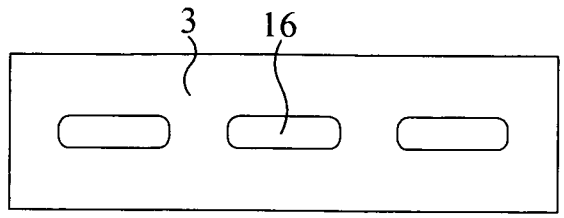
Fig 3a
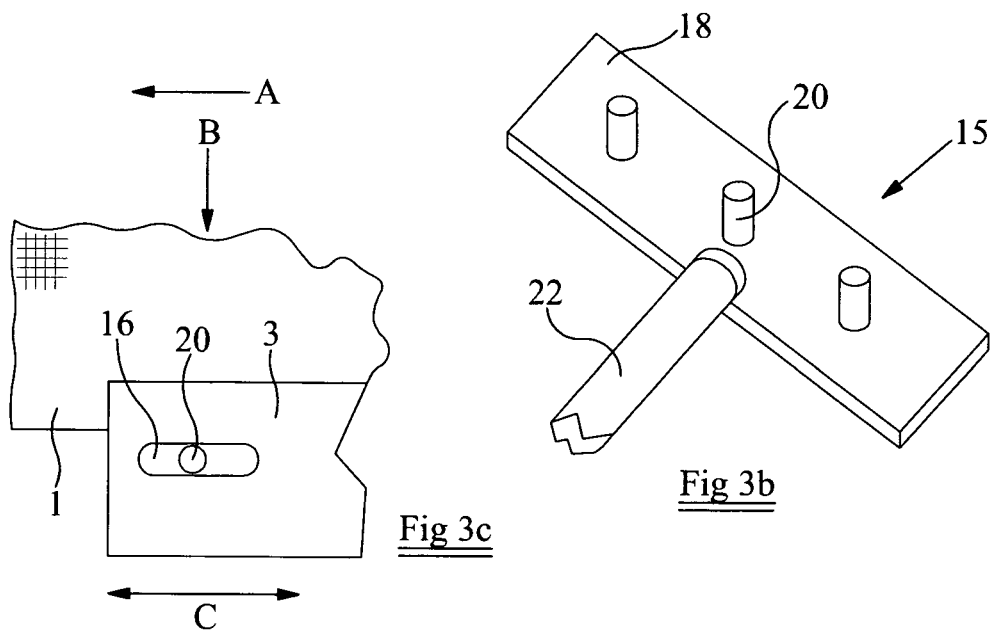
Fig 3b
Fig 3c
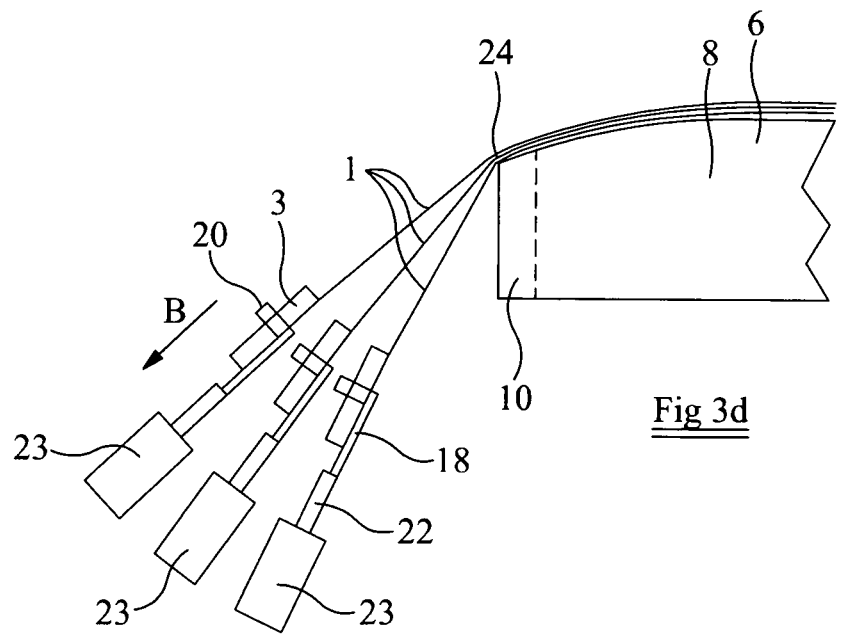
Fig 3d

MANUFACTURE OF A FILTER SCREEN

CROSS-REFERENCE TO RELATED APPLICATIONS

This application is the U.S. National Phase of PCT/GB2010/000328 filed Feb. 24, 2010, which claims priority of Great Britain Patent Application 0903197.2 filed Feb. 25, 2009.

FIELD OF THE INVENTION

This invention relates to a method of manufacturing a filter screen and apparatus for use with the method. The invention is especially concerned with filter screens for use in vibratory filtration equipment used for separating solids from muds used in oil drilling operations.

BACKGROUND TO THE INVENTION

Filter screens used in the field of this invention are described for example in WO95/23655, WO98/37988 and GB2388558. Typically tensioned wire meshes (wire cloths) are bonded to frames of plastic or metal reinforced plastic materials. The bonding may be by means of an adhesive or by heat softening the plastic surface of the frame and pressing the wire cloths into the softened plastic. Heating the wire cloths may be employed as the method of softening the plastic. After cooling a filtering screen having pretensioned mesh cloths is produced. Preferably two or more wire cloth layers of differing mesh size and wire diameters are employed in a screen. For optimal performance these are pretensioned individually to ensure the correct tension. In some cases they may be pretensioned to different extents.

Careful tensioning of the wire cloths to selected tensions and avoidance of creases or other defects in the tensioned cloths of the filter screens produced is required to avoid loss of screening performance and early failure (holing) of the screens.

Various means of gripping the edges of wire cloths and then applying forces to tension the cloth across a screen frame before bonding thereto are known. Typically a number of clamps are employed to grip the edges of the wire cloth and the clamps are driven (for example pneumatically or mechanically) outwardly of the screen frame to achieve the desired tension. Tension is applied in orthogonal directions to ensure the apertures in the mesh are kept open in the tensioned mesh. The gripping of the cloths should be arranged to allow the tensioning process to occur without slippage of the cloths in the clamps and consequent loss of control of the tension. At the same time the grip should not damage the cloth to the extent that tearing can occur.

It is an object of the present invention to provide methods and apparatus for manufacturing filter screens that avoid or at least minimise one or more of the aforementioned problems.

DESCRIPTION OF THE INVENTION

According to a first aspect the present invention provides a method of manufacturing a filtering screen comprising:
attaching handle members to edges of at least one wire cloth;
providing a jig comprising tensioning means;
placing the at least one wire cloth in the jig and engaging the handle members with handle member engagement portions of the tensioning means;
operating the tensioning means to drive the handle members outwardly to tension the wire cloth in orthogonal directions;
pressing the tensioned wire cloth against a screen frame;
bonding the wire cloth to the screen frame; and trimming the wire cloth.

The wire cloth may be tensioned before being pressed against the screen frame. In this case the screen frame may be raised from below to press against the tensioned wire cloth or lowered to press down on the tensioned wire cloth.

Alternatively the tensioning step is carried out with the wire cloth being tensioned across the screen frame i.e. the screen frame is pressed into the wire mesh as it is tensioned across it. In this case the screen frame may be located in the jig and the wire cloth laid across it before engagement of the handle members with the tensioning means.

The method may be employed to fit wire cloth to more than one screen frame at a time. Two or more screen frames may be pressed against a wire cloth simultaneously and then bonded to it.

According to a second aspect the present invention provides handle members for use in the method of the invention.

According to a third aspect the present invention provides an apparatus comprising a jig having tensioning means for use in the method of the invention.

The screen frame may be of a plastics material, a reinforced plastic material or of plastics coated metal. Other materials may be employed, for example metal or wood.

Bonding between the screen frame and the wire cloths may be by means of an adhesive, in which case the amount of pressing of the wire cloth to the frame may be just sufficient to ensure good contact between the wire cloth, the screen frame and the adhesive layer. Where the frame comprises plastics, bonding can be by heat softening the plastic surface of the frame so that pressing the wire cloth into the surface of the frame and allowing the heated material to cool embeds the wire cloth in the surface of the frame, bonding the tensioned wire cloth to the frame in the known manner. Advantageously, in the known manner, the wire cloth is itself heated so that when pressed against the frame it acts to soften the plastic material. For example a heated platen may be employed. Heat may be applied across substantially the whole surface of the wire cloth, or at least the whole area to be attached to the frame (i.e. excluding the parts to be trimmed off after the bonding step).

Alternatively heat may be applied selectively, to those parts of the cloth that will form the bonds to the frame.

The method may be used when producing a filtering screen comprising two or more wire cloth layers such as are often employed in apparatus for separating solids from drilling muds. If more than one wire cloth layer is fitted to the frame they may be joined to each other by common handle members before tensioning for bonding to the frame.

Where such joining together of layers of wire cloth is used, the layers may be pre-tensioned before fitting the handle members so that all the wire cloth layers are free of creases relative to each other. The pre-tensioning and fitting of the handle members to the multiple layers of cloth may be carried out in a separate handle attachment apparatus or jig.

However, especially where wire cloths of different mesh and wire size are employed, each cloth may have separate handle members attached. This allows wire cloths to be separately engaged by tensioning means on the jig, and thus separately and selectively tensioned.

The screen frame may have a rectangular shaped periphery with a lattice of intersecting bars in between. In which case the wire cloth or wire cloths may be bonded to both the surface of the periphery and to the surface of the lattice. Any type of screen frame suitable for supporting a wire cloth may be employed, including substantially flat plates, typically of metal or plastics coated metal that are perforated to form a lattice work. The wire cloth is bonded to the lattice to form the filtering screen.

The handle members are attached to edges of the wire cloths. Advantageously, all the edges of each wire cloth layer have at least one handle member attached. The cloth can then be securely gripped, for example by clamps of the jig or engaged by the handle member engagement portions of the tensioning means, at each edge of the cloth during the tensioning procedure.

Typically each edge of a wire cloth will have several handle members attached, spaced at intervals along the edge. A separate handle member engagement portion of the tensioning means may engage each handle member. Such arrangements have the advantage of allowing the tensioning means to act independently at each handle member, thereby assisting in providing an even tension across the wire cloth. For example if the cloth is uneven or if the handle members are not attached to the cloth in a consistent manner along the edges.

Alternatively a single handle member can be provided, on each edge of the wire cloth. The single handle member runs along substantially the whole length of the edge of a screen frame to which the wire cloth will be attached. In this case, to avoid creasing of the wire cloth the wire cloth may be pre-tensioned (in a separate handle attachment apparatus or jig), before attachment of the handle members. The pre-tensioning may be of the whole cloth piece bounded by the handle members or may be only of the mesh in the vicinity of each edge of the wire cloth. The pre-tensioning is to a tension similar to that employed when bonding the wire cloth to the screen frame.

By attaching long single handle members along the edges of a pretensioned wire cloth, creasing along the edges of the mesh is avoided. After attachment of the handle members the wire cloth is removed from the pre-tensioning apparatus and can then be placed in the jig including the tensioning means with handle member engagement portions. It is then retensioned and subsequently bonded to a screen frame.

Although this approach makes use of an additional apparatus, to pre-tension the wire cloth, it has some advantages. As only a single handle member is fitted to each edge of the wire cloth, only one handle member engagement portion is required at each edge of the jig. Tensioning of the wire cloth can be carried out by providing a single tensioning means at each edge of the jig, or as discussed below, at only two edges of the wire cloth. The reduction in complexity of tensioning means in the jig makes it easier to place the wire cloth in the jig, engage the handle members and carry out the tensioning and bonding to the screen frame steps.

Furthermore when reduced numbers of tensioning means are employed at each edge of the jig the system is more compact, making it easier to provide separate tensioning means when two or more wire cloth layers are to be fitted to a screen frame. The multiple tensioning means can be located closer to the edges of screen frames, reducing the wastage of wire cloth when the handle members are removed at the end of the process.

Generally screen frames are rectangular and the wire cloths fitted thereto have four edges. A separate wire cloth tensioning means may be provided along at least two adjacent sides of each cloth layer for orthogonal tensioning. The other two edges of the cloth may be held in clamps whilst the tensioning means operates.

Alternatively a cloth tensioning means is provided for each cloth layer along each edge.

Providing handle members attached to the wire cloths has a number of advantages. The handle members aid secure interengagment between the tensioning means and the mesh cloth avoiding slippage during the tensioning procedure that can occur where the tensioning means is secured to the mesh by clamps, which bite directly on the mesh.

Additionally the handle members can evenly spread the load applied to the cloth avoiding tearing. Furthermore when locating the edges of two or three wire cloths in the clamps of tensioning means in prior art apparatus there are risks of creasing, misaligning or failing to properly locate the wire cloth edges in the clamps. This results in loss of control of the tensioning procedure. With the present invention handle members can be carefully attached to the wire cloths away from the crowded environment of the jig and its associated tensioning means. The handle members can then be positively engaged by the handle member engagement portions of the tensioning means ensuring consistent tensioning.

The handle members are attached to the edges of the wire cloths. They may be attached by mechanical fittings. For example, pins pressing through the cloth connecting opposed parts of the handle member on either side of the cloth. Other mechanical means such as spring loaded clips, clamps or bolts and nuts may be used. Advantageously the handle members are bonded to the wire cloth, for example by an adhesive.

Alternatively the handle members may comprise a plastics material which is heat softened to allow embedding of the mesh in a surface of the handle member in a similar fashion to that described for above bonding the cloth to the screen frame.

After use in the manufacture of a filtering screen the handle members are removed when the excess wire cloth is trimmed. Alternatively the handle members may be removed before trimming the wire cloth. For example where the handle members are attached by mechanical fixing to the wire cloths they may be removed before the cloth is trimmed. The handle members may be reused if desired.

The handle members and the corresponding engagement portions of the tensioning means are formed for interengagement, at least when tension is being applied to the cloth.

For example the handle member may comprise an elongate bar of a plastic material attached to an edge of the wire cloth and the engagement portion may be a conventional clamp (mechanical, pneumatic or hydraulic) whose jaws grip the bar, thus spreading the load applied to the mesh during tensioning. Whilst such an arrangement can provide satisfactory results, the handle members and/or the engagement portions can be formed and arranged for a more positive and secure interengagement if desired.

For example where the handle member is an elongate bar of plastic material as described above but the engagement portions of the tensioning means are clamps whose jaws close around the bar with the leading edges of the jaws inwards of the bar, (closer to the screen frame edge). As the tensioning means drives the jaws outwardly the leading edges of the jaws hold the bar captively, preventing slippage.

Alternative arrangements can include a handle member that is shaped to engage securely in a correspondingly shaped recess or slot in the engagement portion of the tensioning means. For example the handle member may be wedge shaped. For example narrow nearer the screen frame and wider towards the edge of the cloth. The wedge is located in a corresponding recess of the handle engagement portion of the tensioning means when the cloth is not under tension, and securely interengages with the recess as the tensioning means drives the handle member outwardly of the frame.

Yet further alternatives include handle members provided with hooks or loops for interlocking with corresponding hooks or loops of engagement portions.

Advantageously the handle members are provided with slots for engagement with the engagement portions of the tensioning means. In use the engagement portions are located in or through the slots so that when the tensioning means are operated the engagement portions act against edges of the slots to hold the handle members as they are driven outwardly to tension the wire cloth. Where the handle members are provided with slots the engagement portions of the tensioning means may comprise pins which are sized to fit through the slots. This arrangement has the convenience that the handle members can be easily and correctly engaged with the tensioning means. The pins of each tensioning member hold the wire cloth in place until all the handle members are fitted and the tensioning process is begun.

More advantageously where slots are provided, the slots are of larger dimension than the pins or other parts of the engagement portions of the tensioning means that fit in or through them, at least in the direction parallel to the edge of the wire cloth associated with the handle member (i.e. parallel to the edge of the frame to which the cloth is to be fitted).

Providing handle members with slots of this form, elongate, in the direction of the edge of the frame, has the advantage of allowing some lateral movement of each handle member. Wire cloths are tensioned in orthogonal directions before bonding to a rectangular screen frame. The elongate slots allow creasing in the cloth (that may be present after tensioning has been applied in one direction) to be removed when the cloth is tensioned in the other, orthogonal, direction.

A yet further advantage of this form of arrangement is that it can be compact, handle members comprising slots and engagement portions comprising pins take less space than other clamping arrangements, such as pneumatic or hydraulic clamps. For example, where two or three wire, cloths are fitted to a screen frame and each cloth is separately tensioned across the frame then the two or three separate sets of clamps and tensioning means, placed at each edge of the jig, must be spaced at some distance from the corresponding edge of the screen frame, because of their size. This is necessary to allow each cloth layer an uninterrupted path from the edge of the screen frame to its own clamp jaws and associated tensioning means. This arrangement results in significant wastage of wire cloth. The wire cloth between the screen frame edge and the relatively distant clamp jaws is cut away following the bonding step and is waste.

With the use of handle members provided with slots and engagement portions comprising pins the distance between the screen frame edge and the engagement portions can be greatly reduced as illustrated hereafter with reference to a particular embodiment, resulting in substantially less waste of wire cloth.

Other crease removing or inhibiting techniques can be used in the method of the invention if desired. For example the jig may be supplied with breaker bars along its edges such as are known in the art. These are bars running parallel to the edges of the screen frame over which the wire cloth is pulled during tensioning, providing a "break" between the tensioning means and the frame edge. The breaker bars act as a fulcrum to interrupt creases in the wire cloth formed at the tensioning means, preventing them from running onto the cloth stretched across the screen frame.

As another alternative or additional crease inhibiting technique the method may include the fitting of crease inhibiting members to the wire cloth inward of the handle members as described hereafter.

The tensioning means drives the handle members outwardly and hence tensions the cloth or cloths. The tensioning means may be of any form such as is known in the art. For example the tensioning means may include pneumatic or hydraulically driven pistons in cylinders to which handle engagement portions such as clamps are attached. Alternatively the tensioning means may be a screw turned manually or by a motor drive.

The method of the present invention may be carried out manually but can conveniently be automated or semi-automated. For example wire cloth provided as a roll can be unwound, fitted with handle members, then tensioned in a jig and bonded to a screen frame or frames as described above. The excess wire cloth and handle members are then trimmed away. Some or all of these steps may be automated as desired.

Conveniently where a roll of wire cloth (or wire cloths) is used in the methods of the invention the handle members are pre-fitted to the whole roll. Thus a roll of wire cloth, with handle members attached can be prepared in one location and then transported to the location where the screens are made, for unrolling and bonding to frames.

BRIEF DESCRIPTION OF THE DRAWINGS

Further preferred features and advantages of the present invention will appear from the following detailed description given by way of example of some preferred embodiments illustrated with reference to accompanying drawings in which:

FIG. 3a shows in plan view a handle member of the invention comprising slots;

FIG. 3b shows in schematic perspective a handle engagement portion of a tensioning means;

FIG. 3c shows a detail in plan view of the interengagement of the handle member of FIG. 3a with the handle engagement portion of FIG. 3b;

FIG. 3d shows in schematic elevation the use of the handle members and engagement portions of FIGS. 3(a-c) to tension wire cloths;

FIG. 4b shows the use of crease inhibiting members fitted to the wire cloth of FIG. 4a;

DETAILED DESCRIPTION OF THE DRAWINGS

Figure 1:
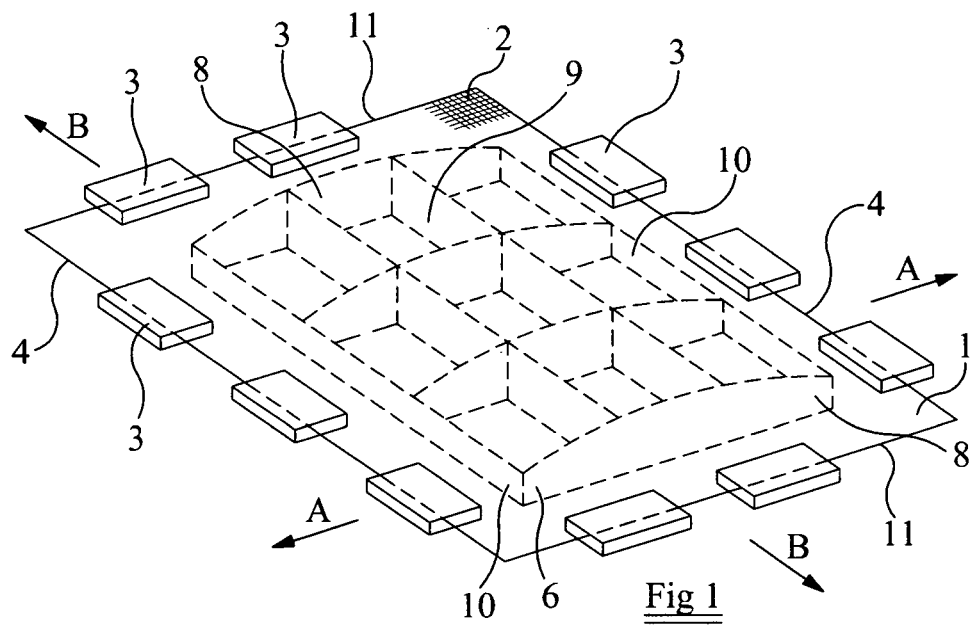
FIG. 1 shows in schematic perspective a wire cloth fitted with handle members.

FIG. 1 shows a wire cloth 1, with only a portion of the mesh indicated by the hatching 2, for clarity. The wire cloth 1 is ready for tensioning.

Handle members 3, in this example rectangular plastic blocks are bonded to opposed pairs of edges 4 and 11 of the wire cloth 1. A screen frame 6 is placed under the wire cloth 1. The screen frame is rectangular in form and includes opposed pairs of ends 8 and sides 10. A lattice of intersecting bars 9 is provided between the ends and sides 8, 10 to support the wire cloth 1 when fitted to the screen frame 6.

As indicated by the arrows A and B the wire cloth can be tensioned in orthogonal directions by pulling on the handle members 3 by tensioning means located in a jig (not shown for clarity). The tensioning in this example is carried out across the frame 6 (see FIG. 2); so that the frame is pressed into the wire cloth 1 as the tensioning operation is carried out. The frame 6 is made of a plastics coated metal. Heating the wire cloth 1 and pressing it further into the frame 6 bonds the cloth 1 to the frame 6. The excess cloth, outside the frame 6, may then be trimmed away together with the handle members 3. The handles 3 may be reused.

Figure 2A:
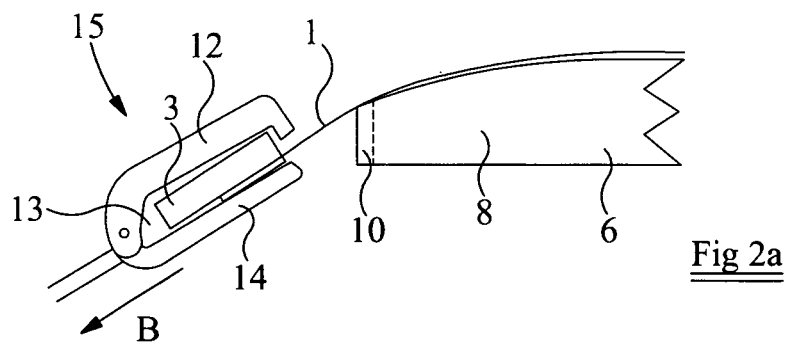
FIGS. 2a, 2b show in schematic elevation tensioning of a wire cloth using the handle members of the invention.

FIG. 2a shows a detail in elevation of the frame 6 pressing against the wire cloth 1 during tensioning. Handle member 3 is gripped between the upper 12 and lower 14 jaws of a clamp, which constitutes the handle member engagement portion 15 of a tensioning means. The tensioning means is driving the handle member 3 and hence the wire cloth 1 outwardly in the direction of the arrow B by means of a pneumatically driven piston (not shown) which connects to the handle member engagement portion 15. By this means the wire cloth 1 is tensioned across the screen frame 6. In this example the handle member locates in a recess 13 of the upper jaw 12 and so is held captively during the tensioning process.

Figure 2B:
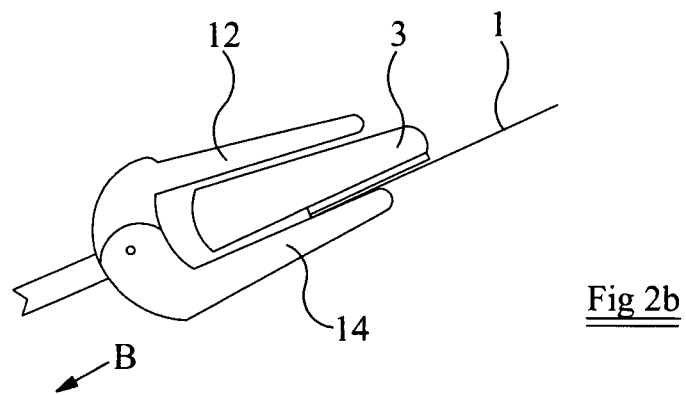

An alternative, a wedge shaped handle member 3 is shown in FIG. 2b. The wedge shape allows the jaws 12, 14 to securely grip the handle member during tensioning.

FIG. 3a shows in plan view a handle member 3, of a plastics material. The handle member 3 comprises slots 16 which are elongate in the transverse direction (in a direction parallel to the corresponding edge of a wire cloth when fitted to it). A handle member engagement portion 15 suitable for interengagement with the handle member 3 of FIG. 3a is shown in FIG. 3b. The engagement portion 15 comprises a flat metal bar 18 fitted with short pins 20 that are sized to fit in the slots 16 of the handle member of FIG. 3a. A rod 22 is connected to a piston in cylinder arrangement (see FIG. 3d) for driving the engagement portion 15.

The plan view detail of FIG. 3c shows a pin 20 of the engagement portion 15 of FIG. 3b located in a slot 16 of the handle member of FIG. 3a. As indicated by the arrow C transverse movement of the handle member 3 about the pin 20 can occur, even when the handle member and wire cloth 1 are tensioned in the direction of the arrow B. The slot 16 thus allows removal of creases from wire cloth 1 when tensioning the cloth in the orthogonal direction indicated by the arrow A.

FIG. 3d shows in elevation a detail of three wire cloths 1 being tensioned across a screen frame 6. Each wire cloth 1 has handle members 3 of the form shown in FIG. 3a bonded to the edge of the wire cloth 1. Handle member engagement portions 15 of the form shown in FIG. 3b engage the handle members 3 by means of the pins 20 on flat bars 18. Tensioning is applied in the direction of the arrow B by means of conventional pneumatically driven piston and cylinder arrangements 23 connected by the rods 22 to the metal plates 18. Each wire cloth can therefore be individually tensioned across the frame 6, about the edge 24 of the frame side 10. Once all the cloths 1 are correctly tensioned in orthogonal directions, heat can be applied, for example by a heated platen, to the cloths 1 to bond the cloths to the frame 6.

The arrangement shown in FIG. 3d is particularly compact as the handle members 3 and handle member engagement portions 15 can be substantially thinner than conventional clamping arrangements. This allows the tensioning means (engagement means 15, rods 22 and pistons in cylinders 23), to be located only a short distance from the screen frame edge 24. Despite the short distance, the thin handle members 3 and engagement portions 15 allow each cloth 1 a clear uninterrupted path to the screen frame edge 24, ensuring that the desired tension is correctly applied across the frame 6. The short distance between the handle members 3 and the screen frame edge 24 means that there is much less wastage of wire cloth 1 when the edges are trimmed away (following the bonding step) than when using conventional clamps.

Figure 4A:
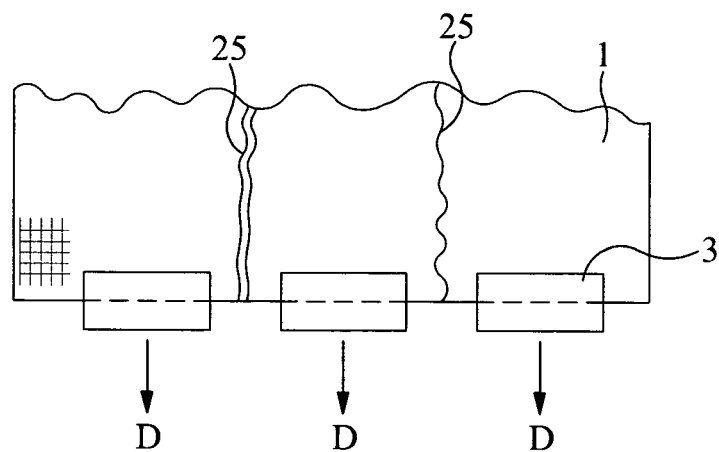
FIG. 4a shows handle members attached to a wire cloth.
Figure 4B:
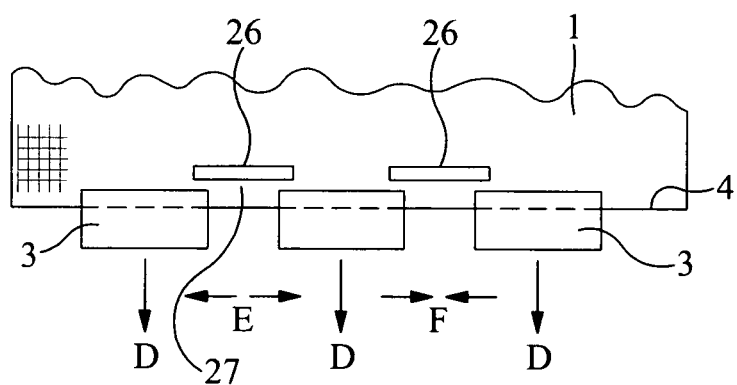

FIG. 4a shows in schematic plan view the edge of a wire cloth 1 fitted with handle members 3 being tensioned in the general direction of the arrows D. If the tensioning force and direction is not consistent or parallel at each handle member 3 then creases 25 can occur. These creases 25 may be removed where the handle members 3 have slots as shown in FIG. 3 and when the orthogonal tensioning is applied. Alternatively or additionally crease-inhibiting members 26 as shown in FIG. 4b may be employed to inhibit crease formation. The crease-inhibiting members 26 are made of a resilient rubber or rubber like material and are bonded to the wire cloth 1 inward of the handle members 3. As shown in FIG. 4b the crease-inhibiting members 26 may be sized to bridge the gaps 27 between adjacent handle members 3. Alternatively a continuous crease-inhibiting member 26 may be applied along each edge of the wire cloth. The crease-inhibiting members 26 act to reduce or prevent creasing by resisting stretching or narrowing of the gaps (as indicated by arrows E and F) by virtue of their resilient properties. A yet further alternative or additional means of inhibiting creases is the use of breaker bars as described hereafter with reference to FIG. 7.

Figure 5A:
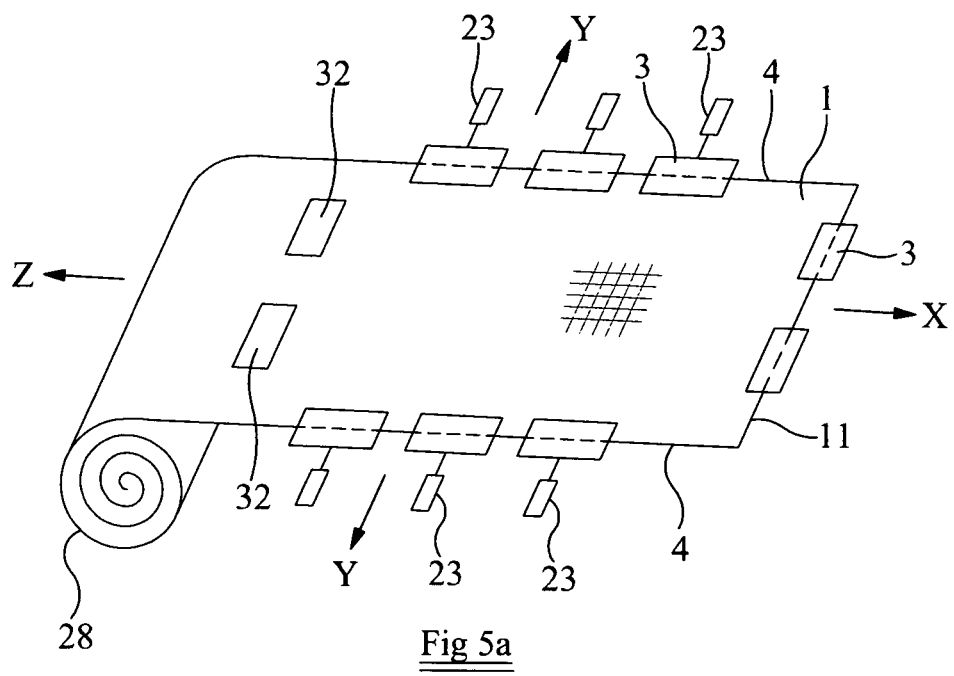
FIGS. 5a, 5b illustrate schematically the method of the invention.

FIG. 5a shows schematically the method of the invention applied when the wire cloth 1 is provided on a roll 28.

The method illustrated is suitable for automation or semi-automation.

In this example tensioning of the wire cloth 1 is carried out before pressing a screen frame to the tensioned cloth. A roll 28 of wire cloth 1 is pre-fitted with handle members 3 along the edges of the cloth.

Additional handle members 32 are located across the width of the cloth in this example. The cloth 1 is pulled through a jig in the direction of arrow X and the handle members 3 on opposite side edges 4 of the cloth 1 are engaged by engagement portions (not shown for clarity) of tensioning means which include piston and cylinder arrangements 23 similar to those discussed above (FIG. 3d). The wire cloth is then tensioned in the direction of arrows Y by the action of the pistons in cylinders 23.

The handle members 3 of the front edge 11 of the cloth 1 and the additional handle members 32 are then engaged by tensioning means (see FIG. 5b) and orthogonal tensioning, in the direction of arrows X and Z is applied. Thereafter a screen frame (not shown) can be pressed onto the tensioned wire cloth mesh, inside the area bounded by the handle members 3,32, either from below or from above and a bonding step carried out. For example by applying a heated platen to the wire cloth, making use of a non stick element such as a PTFE sheet between the wire cloth and the platen to prevent inadvertent bonding of the mesh or the frame to the platen.

After the bonding step the excess wire cloth and handle members are trimmed away and the process can be repeated by drawing the next section of cloth 1 from the roll 28.

Figure 5B:
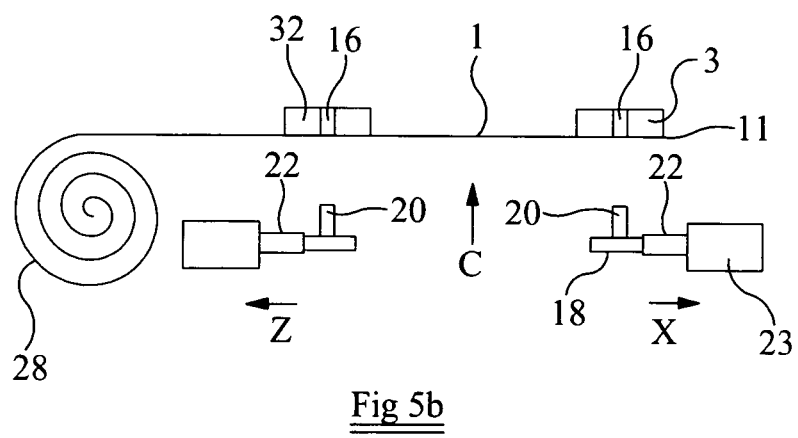

FIG. 5b illustrates in elevation the engagement of handle members 3 of edge 11 and the additional handle members 32. Tensioning means of the form shown in FIG. 3d and described above (comprising pins 20, flat metal plates 18, rods 22 and piston and cylinders 23) are raised in the direction of arrow G to engage the handle members 3, 32 which are provided with slots 16 to receive the pins 20. Tensioning can then be applied in the direction of arrows X and Z.

The method described above can also be employed where two or three wire cloth layers are applied to a screen frame.

The method may be modified in various ways. For example a screen frame may placed in the jig and tensioning and pressing to the screen frame carried out together as described above in respect of FIGS. 1 to 3.

For example the additional handle members 32 may be omitted and tensioning in the direction of arrows X and Z achieved by temporarily locking the roll 28 of wire cloth 1 to prevent unrolling. Tensioning means are then engaged with the handle members 3 along edge 11 of the wire cloth and activating the tensioning means provides the desired tension between the locked roll 28 and the handle members 3 at the edge 11.

Figure 6A:
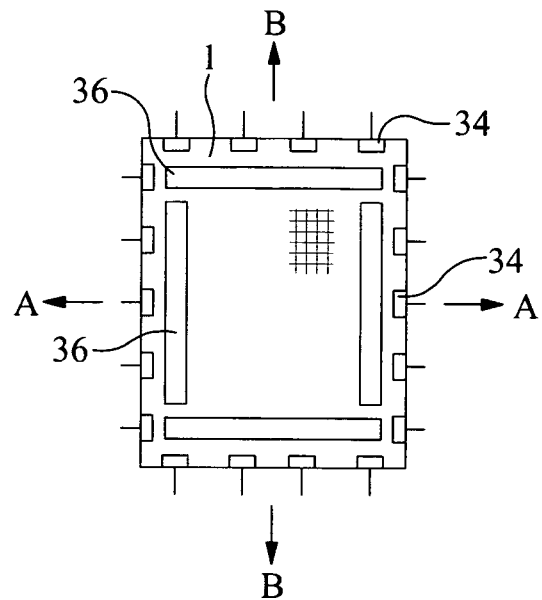
FIGS. 6a, 6b show handle members being attached to a pre-tensioned wire cloth.

FIG. 6a shows schematically a wire cloth 1 which is being held under tension in orthogonal directions (as indicated by the arrows A and B) in a pre-tensioning apparatus that makes use of a series of clamps and associated tensioning means 34. The clamps bite directly on the wire cloth 1. After tensioning the cloth 1 to the tension used when forming a filtering screen in a jig a single elongate handle member 36 is bonded along each edge of the wire cloth 1. The pre-tensioning ensures that the wire cloth is not creased. After attachment of the elongate handle members 36 the wire cloth is released from the clamps and tensioning means 34. The wire cloth 1 with handle members 36 attached can then be placed in a jig for tensioning and bonding to a screen frame as described before. The single handle member 36 along each edge of the wire cloth 1 means that the jig need only be provided with one tensioning means for each edge of each cloth layer to be fitted to a screen frame.

Figure 6B:
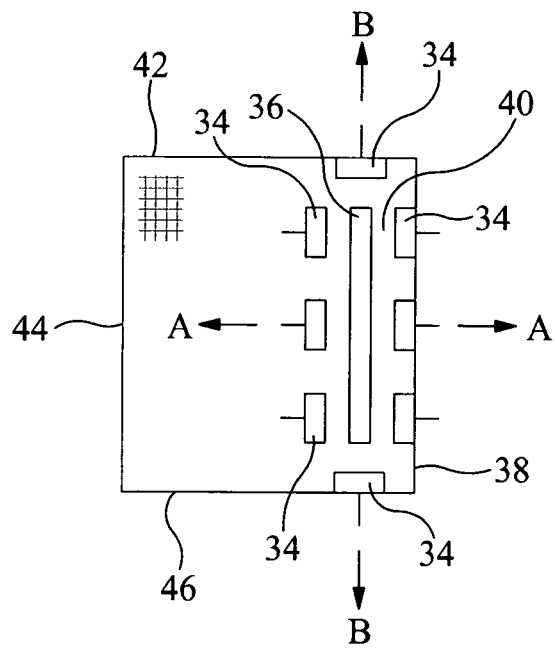

FIG. 6b shows an alternative pre-tensioning approach. The wire cloth 1 is pretensioned only in the vicinity of the edge 38, the area 40 bounded by the location of the clamps and tensioning means 34. The tensioning removes any creasing in the vicinity of the edge 38 (area 40), following which handle member 36 is bonded to the wire cloth. The procedure can then be repeated along the other three edges 42,44,46 to attach a further three handle members without the wire cloth being creased. The wire cloth 1 with four handle members 36 attached can then be placed in a jig for tensioning and bonding to a screen frame as described before.

Figure 7:
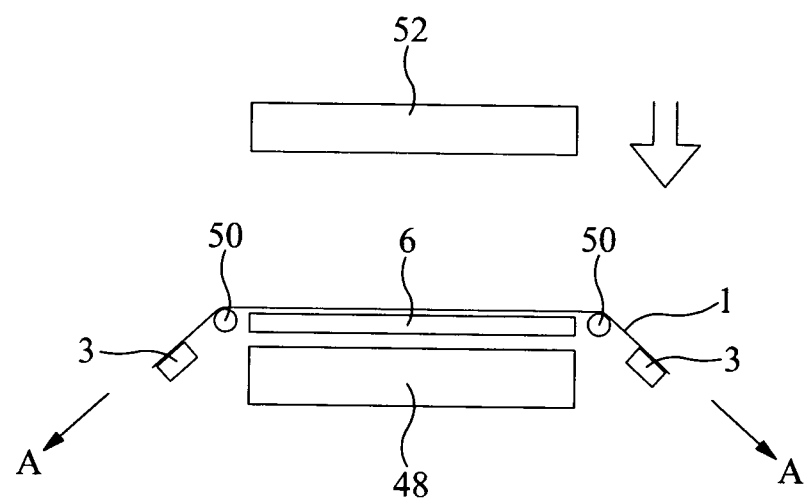
FIG. 7 shows in schematic elevation bonding of a tensioned wire cloth to a frame.

FIG. 7 illustrates in schematic elevation bonding of a wire cloth 1 to a frame 6. The frame 6 is a substantially flat, plastic coated perforated metal sheet and has been placed on a table 48 of a jig. The wire cloth is tensioned in the direction of the arrows A, across the frame 6 and breaker bars 50 of the jig. The breaker bars are rods running alongside the edges of the frame 6 that act to prevent creases, which may form on the cloth 1 near the handle members 3, from propagating across the cloth 1 where it contacts the frame 6. A heated platen 52 is then lowered onto the cloth 1 pressing it into the frame 6. The platen heats the cloth 1 causing melting of the plastic coating on the frame 6. On removal of the platen the molten plastic cools, bonding the cloth 1 to the frame 6.

The invention claimed is:

1. A method of manufacturing a filtering screen comprising:
   attaching handle members to edges of at least one wire cloth;
   providing a jig comprising tensioning means;
   placing the at least one wire cloth in the jig and engaging the handle members with handle member engagement portions of the tensioning means;
   operating the tensioning means to drive the handle members outwardly to tension the wire cloth in orthogonal directions;
   pressing the tensioned wire cloth against a screen frame;
   bonding the wire cloth to the screen frame; and
   trimming the wire cloth;
   wherein the handle members comprise a plastics material and are attached to an edge of the wire cloth by heat softening the plastic and embedding the edge of the wire cloth in the softened plastic.

2. The method according to claim 1 wherein the wire cloth is tensioned before being pressed against the screen frame.

3. The method according to claim 1 wherein the screen frame is pressed into the wire mesh as it is tensioned.

4. The method according to claim 1 wherein wire cloth is bonded simultaneously to more than one screen frame.

5. The method according to claim 1 wherein the screen frame material is selected from the group consisting of plastics, reinforced plastics, plastics coated metal, metal and wood.

6. The method according to claim 1 wherein the at least one wire cloth is bonded to the screen frame by heat softening a plastic surface of the screen frame.

7. The method according to claim 6 wherein the wire cloth is heated so that when pressed against the frame it acts to soften a plastic surface of the screen frame.

8. The method according to claim 7 wherein heat is applied selectively to the wire cloth, to those parts that form bonds to the screen frame.

9. The method according to claim 1 wherein more than one wire cloth layer is bonded to a screen frame and the layers of wire cloth are joined to each other by common handle members before tensioning and bonding to the screen frame.

10. The method according to claim 9 wherein the layers of wire cloth are pre-tensioned before fitting the handle members.

11. The method according to claim 1 wherein more than one wire cloth layer is bonded to the screen frame and each layer of wire cloth has separate handle members attached.

12. The method according to claim 1 wherein each edge of each wire cloth employed has at least one handle member attached.

13. The method according to claim 1 wherein a single handle member is provided, on each edge of the wire cloth; each handle member being sized to run along substantially the whole length of the edge of a screen frame to which the wire cloth will be attached.

14. The method according to claim 13 wherein the wire cloth is pre-tensioned before attachment of the handle members.

15. The method according to claim 1 wherein each wire cloth has four edges and a tensioning means is provided along at least two adjacent edges of each cloth layer for orthogonal tensioning.

16. The method according to claim 15 wherein a cloth tensioning means is provided for each cloth layer along each edge.

17. The method according to claim 1 wherein the handle members are provided with hooks or loops for interlocking with corresponding hooks or loops of engagement portions of the tensioning means or are wedge shaped.

18. The method according to claim 1 wherein the handle members are elongate bars of a plastics material.

19. The method according to claim 1 wherein the handle members are provided with slots for engagement with the handle member engagement portions of the tensioning means.

20. The method according to claim 19 wherein the handle member engagement portions of the tensioning means comprise pins that are sized to fit through the slots of the handle members.

21. The method according to claim 20 wherein the slots of the handle members are of larger dimension than the pins of the handle member engagement portions of the tensioning means.

22. The method according to claim 21 wherein the slots of the handle members fitted along an edge of a wire cloth are of larger dimension than the pins of the handle member engagement portions of the tensioning means in the direction parallel to the edge of the wire cloth to which they are fitted, thereby allowing some lateral movement of the handle members during tensioning, to remove creases.

23. The method according to claim 1 wherein the jig is supplied with breaker bars along its edges.

24. The method according to claim 1 wherein crease inhibiting members are fitted to the wire cloth, inward of the handle members.

25. The method according to claim 1 wherein the tensioning means comprises pneumatic or hydraulically driven pistons in cylinders, or a screw turned manually or by a motor drive, to which a handle engagement portion is attached.

26. The method according to claim 1 wherein wire cloth is provided in the form of a roll with handle members pre-fitted, for unrolling and bonding to a succession of screen frames.

\* \* \* \* \*